2,945,682

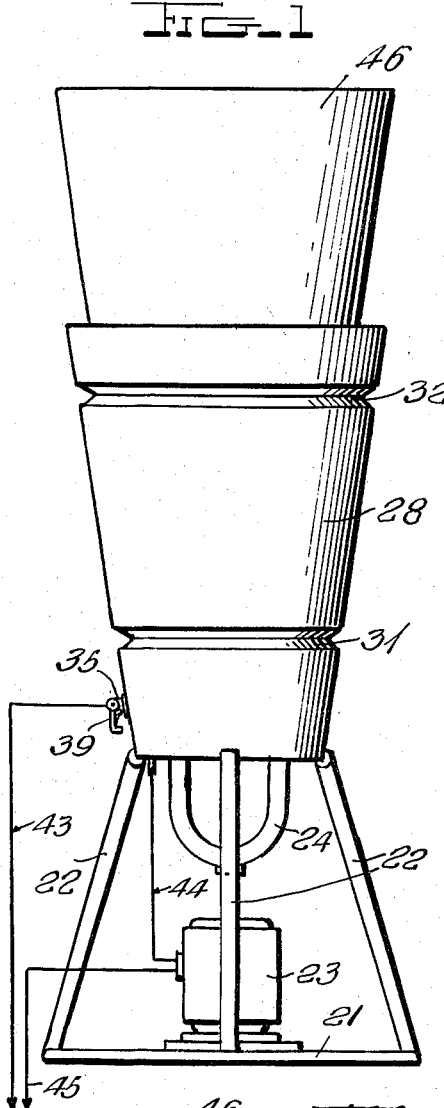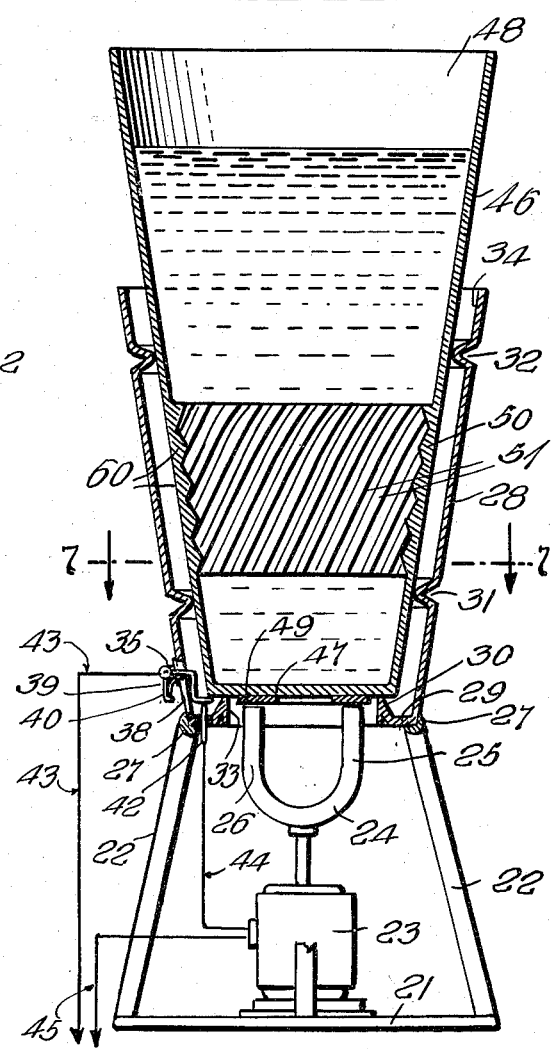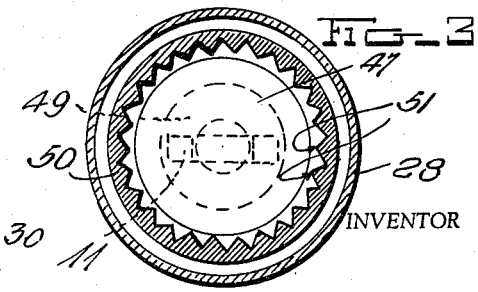

MIXERS AND CONTAINERS

R Lee Hollingsworth, 514 Hempstead Ave.,
West Hempstead, N.Y.

Filed Nov. 4, 1957, Ser. No. 694,411

11 Claims. (Cl. 259—81)

The present invention is concerned with powered mixers of the counter type and is more especially directed to a mixer of ingredients within a container which serves for carrying and dispensing the resulting mixture.

The primary object of my invention is to provide economically producible mixers having a container for ingredients to be mixed which is quickly and easily detachable from and replaceable on the mixer and in which said ingredient can be mixed as desired.

A further and important object of the invention is to provide a mixer of liquids and liquids with solids which are mixed in the container from which they are to be transported, dispensed or consumed and which includes mixing means within the container operable without mechanical connection to exterior driving means.

Another and equally important object is to provide apparatus including a driven magnet for rotating mixing elements attracted to a container, thus eliminating the use of conventional stirrers which are presently inserted in containers each time the mixer is to be used and also permitting the use of containers which can be thrown away after use thereof.

A still further object of the invention is to provide a novel container wherein the ingredients are mixed and which container performs the mixing operation without employing attached or separate stirrers for this purpose and which permits the "carrying out" of the mix to other localities and the eventual consumption and use of the mix therefrom.

A further object of the present invention is to provide a mixing machine wherein the container is rotated having grooves or extrusions on the inside and/or on the outside thereof. Other objects of the invention will be apparent in the following detailed description of the accompanying drawings, in which:

Fig. 1 is a side elevation of a modified form of mixer.

Fig. 2 is a vertical section of said mixer.

Fig. 3 is a cross-sectional view taken on line 7—7 of Fig. 2.

Fig. 4 is an enlarged detail view of a portion of the mixer partly in section showing a current controlling switch in its closed position; and Fig. 5 is a view similar to Fig. 4, but showing said switch in its open or non-conducting position.

Referring now more particularly to the accompanying drawings, wherein like and corresponding parts are designated by similar reference characters.

The mixer shown in Figs. 1 to 5 inclusive comprises a disc-shaped base 21 from which extend a plurality of uprights 22. An electric motor 23 is mounted on said base with its axis extending substantially perpendicular thereto and with a U-shaped magnet 24, which may be either permanent magnet or an electromagent, is fixedly connected to said motor for being rotated with the legs 25 and 26 of said magnet extending substantially parallel to the axis of said motor.

The upper ends of leg 22 are recesses as at 27 for receiving and supporting the bottom 29 of a cylindrical housing 28. Said bottom 29 has an upwardly extending annular flange 30 while the sides of said housing are grooved at 31 and 32 by being pressed inwardly to form annular interior flanges in said housing. Flange 30 also forms a wall for an opening 33 in said housing body into which extends legs 25 and 26 of said magnet. The upper end of said housing is open providing a mouth 34 while the lower portion has an exterior arm 35 supporting a stub axle 36 to which is pivotally supported an S-shaped arm 37 extending through opening 38 in said housing. Arm 35 further fixedly supports finger 39 upon which is mounted a spring 40 bearing against arm 37 tending to raise the same. Bottom 29 of said housing has a bushing 41 of insulating material through which extends a pin 42 positioned for being contacted by the free end of arm 37 when pressed downwardly. Wire 43 is connected to axle 36 at one end and to one pole of a source of electrical current at the opposite end. A wire 44 connects pin 42 with one pole of a motor 23 while a further wire 45 connects the other pole of said motor to the second pole of a source of electrical current.

A cylindrical container 46 which may be of a material attracted to a magnet such as a magnetic material or it may be of a non-magnetic material such as paper, plastic, glass or non-magnetic materials such as aluminum, having a bottom 47 and an open top 48. A ring 49 of a material attracted to a magnet is connected to said bottom 47 or may be printed thereon. Container 46 further has a portion 50 formed with a plurality of lands 51 formed therewith which lands extend on preferably a slant relative to the axis of said container and may be pressed or molded into the material forming the container depending upon the material being employed. For example each container 46 is of paper, the lands can be pressed into the sides of said container during the formation thereof or if the container is plastic, glass or metal, it may be molded during the formation of said container.

In the operation of the present mixer, wires 43 and 45 are connected to a source of electrical current and the ingredients to be mixed placed within container 46. Said container is then inserted through the mouth 34 of housing 28 until its bottom 47 contacts lever 37 and pushes the same against pin 41 closing the electrical circuit to motor 23 and said bottom is loosely mounted on the upper edge of flange 30. At such time, the inner faces of grooves of 31 and 32 will loosely engage the periphery of said container.

Magnet 24 will directly engage ring 49 forming a magnetic clutch therewith causing said ring and container 46 to rotate with the magnet 24. The rotation of said lands 51 will produce a mixing and agitation of the ingredients in container 46 as the heavier ingredients will tend to resist rotation therewith. Grooves 31 and 32 will maintain container 46 in an upright position during such periods of rotation and upon completion of the mixing withdrawal of container 46 from housing 28 will cause spring 40 to raise lever 37, breaking the electrical circuit and stopping motor 23. Container 46 can then be used for dispensing, transporting or the consumption of the ingredients and where made of an inexpensive material such as paper, may be dispensed with after using.

The present invention is capable of considerable modification and such as any form of extrusion extending from the inside wall of the container to produce mixing agitation, and other changes thereto as come within the scope of the appended claims are deemed to be parts of the invention.

What I claim is:

1. A mixer comprising a support, a container detachably and rotatably mounted on said support, stirring means provided in said container, a driving motor mounted on said support, a magnet connected to said motor for being rotated thereby and positioned adjacent said container, and at least a portion of said container includes material attracted to said magnet for rotating said container with said magnet.

2. A mixer as claimed in claim 1, wherein said stirring means includes grooves provided in said container.

3. A mixer as claimed in claim 1, wherein said container is mounted for rotation about the axis thereof and said container has grooves extending at an angle to its axis provided in the sides thereof.

4. A mixer as claimed in claim 1, wherein said magnet rotates about the axis of said container and said container has a material attracted to said magnet provided on the bottom thereof to provide magnetic engagement between said magnet and said container.

5. A mixer as claimed in claim 1, wherein said container is of a material attracted to said magnet.

6. A mixer comprising a support, a container having at least a portion of its interior wall with stirring grooves provided thereon, said support having a tubular portion with said container detachably extending therein, said support tubular portion having annular shoulders rotatably supporting said container bottom and sides, a magnetic material provided on the bottom of said container, a magnet extending towards said container magnetic material for attracting the same and a driving motor connected to and supporting said magnet for rotating the same and said container.

7. A mixer as claimed in claim 6, wherein said container is formed from a non-magnetic material and said container magnetic material is provided by an annular body of magnetic material connected to said container bottom.

8. A mixer as claimed in claim 6, wherein said driving motor is electrically operated, a source of electrical current is connected to said motor and a switch controlling said circuit is mounted on said support for being operated by the insertion and withdrawal of said container relative to said support.

9. A mixer comprising a support, a driving motor mounted on said support, an electro-magnet connected to said motor for being rotated thereby, a non-magnetic container detachably mounted on said support above said magnet, mixing elements carried by said container and means attached to said container providing magnetic attachment to said electro-magnet and rotatable thereby for rotating said container, with said container being detachable when the current through said electro-magnet is discontinued.

10. A mixer comprising a support, a driving motor mounted on said support, a magnet connected to said motor for being rotated thereby, a non-magnetic container detachably mounted on said support above said magnet and stirring means comprising grooves formed in said container, material attached to the outside of said container and attractable to said magnet for rotating therewith.

11. A mixer as claimed in claim 10, wherein said stirring means includes at least one groove formed in said container for stirring ingredients contacted thereby as said container rotates.

References Cited in the file of this patent

UNITED STATES PATENTS

| | | |
|---|---|---|
| 553,554 | De Camp | Jan. 28, 1896 |
| 746,629 | Geer | Dec. 8, 1903 |
| 2,350,534 | Rosinger | June 6, 1944 |
| 2,394,450 | Hogaboom | Feb. 5, 1946 |
| 2,549,121 | Oesterheld | Apr. 17, 1951 |
| 2,864,678 | Fink et al. | Dec. 16, 1958 |

FOREIGN PATENTS

| | | |
|---|---|---|
| 634,234 | Germany | Aug. 22, 1936 |
| 688,113 | Great Britain | Feb. 25, 1953 |